United States Patent [19]

Nelson

[11] Patent Number: 5,172,731
[45] Date of Patent: Dec. 22, 1992

[54] THERMAL INSULATION BLANKET

[75] Inventor: Thomas E. Nelson, Anchorage, Ky.

[73] Assignee: Soltech, Inc., Shelbyville, Ky.

[21] Appl. No.: 584,251

[22] Filed: Sep. 18, 1990

Related U.S. Application Data

[63] Continuation-in-part of Ser. No. 412,923, Sep. 26, 1989, Pat. No. 4,972,759, which is a continuation-in-part of Ser. No. 309,658, Feb. 13, 1989, Pat. No. 4,878,459.

[51] Int. Cl.$^5$ ............................................. F16L 59/14
[52] U.S. Cl. .................................... 138/149; 138/157; 138/177
[58] Field of Search ............... 138/149, 157, 156, 178, 138/177; 428/68, 71, 72, 76

[56] References Cited

U.S. PATENT DOCUMENTS

| | | |
|---|---|---|
| 453,946 | 6/1891 | Shipe . |
| 530,314 | 12/1894 | Williams . |
| 1,153,159 | 9/1915 | Gray . |
| 1,609,858 | 12/1926 | Bohon . |
| 1,860,203 | 5/1932 | Rishel . |
| 2,160,009 | 5/1939 | Walker . |
| 2,324,181 | 7/1943 | Tulien . |
| 2,348,754 | 5/1944 | Ray ..................................... 138/149 |
| 2,756,172 | 7/1956 | Kidd . |
| 3,000,433 | 9/1961 | Kemper ............................ 138/149 |
| 3,058,860 | 10/1962 | Rutter . |
| 3,095,014 | 6/1963 | Doker ................................ 138/149 |
| 3,157,204 | 11/1964 | Phillips ............................. 138/149 |
| 3,244,388 | 4/1966 | Coffman . |
| 3,563,503 | 2/1971 | Lancaster ......................... 138/149 |
| 4,025,680 | 5/1977 | Botsolas et al. .................. 138/149 |
| 4,039,098 | 8/1977 | Stilts . |
| 4,155,377 | 5/1979 | Suzuki et al. .................... 138/149 |
| 4,282,279 | 8/1981 | Strickland . |
| 4,323,088 | 4/1982 | McClellan ........................ 138/157 |
| 4,351,365 | 9/1982 | Bauermeister et al. ......... 138/149 |
| 4,380,253 | 4/1983 | Mead et al. ...................... 138/178 |
| 4,509,561 | 4/1985 | Litz .................................. 138/149 |
| 4,527,543 | 7/1985 | Denton . |
| 4,660,861 | 4/1987 | Argy et al. ....................... 138/149 |
| 4,736,509 | 4/1988 | Nelson . |
| 4,744,488 | 5/1988 | Nelson . |
| 4,749,532 | 6/1988 | Pfeffer . |
| 4,772,507 | 9/1988 | Leo et al. ......................... 138/151 |

Primary Examiner—James E. Bryant, III
Attorney, Agent, or Firm—Woodard, Emhardt, Naughton, Moriarty & McNett

[57] ABSTRACT

A thermal insulation blanket for enclosing or draping a compound curved surface or a generally cylindrical pipe or conduit includes a first plurality of strips of insulation material comprised of an alternating pattern of blocks of flexible insulation material and blocks of rigid insulation material and a second plurality of strips of insulation material comprised of flexible insulation material is alternated with the first plurality of strips. The blocks of material are adhesively joined together to create the first plurality of strips and the two pluralities are adhesively joined together to create the blanket.

1 Claim, 3 Drawing Sheets

THERMAL INSULATION BLANKET

REFERENCE TO RELATED APPLICATIONS

This application is a continuation-in-part patent application of my prior and copending application Ser. No. 412,923, filed Sep. 26, 1989, now issued U.S. Pat. No. 4,972,759, which is a continuation-in-part patent application of prior copending application Ser. No. 309,658, filed Feb. 13, 1989, now issued U.S. Pat. No. 4,878,459.

BACKGROUND OF THE INVENTION

The present invention relates in general to insulation arrangements for complex and compound curved surfaces and cylindrical members such as conduits, pipes, water heaters and the like.

As the present invention pertains to insulation arrangements or blankets for pipes and other conduits and irregular contours, it provides in one embodiment a flexible outer covering which has an insulation assembly laminated to it. This insulation assembly consists of alternating blocks of rigid insulating material and flexible insulating material so that it can be formed into various shapes. The rigid insulation material provides stiffening and a desired rigidity to the flexible outer covering so that it can be shaped and will hold its form. The design of the present invention solves the problem of shipping inefficiencies in that the material used to fabricate the thermal insulation blanket can be shipped in flat form or in blocks where none of the material is wasted. The blending of rigid urethane foam insulation material and flexible insulation material provides an acceptable compromise in overall insulation R-values. This thermal insulation blanket may also be used to insulate the inner tank of a water heater or other conduits, but it is primarily designed for complex and compound curved surfaces.

The present invention includes blocks of rigid insulation material which are surrounded on the sides by flexible insulation material. This surrounding arrangement provides for flexing and shaping of the blanket in virtually any direction and as such the invention provides a suitable thermal insulation blanket for use over and around objects and surfaces having complex, compound or irregular contours.

SUMMARY OF THE INVENTION

A thermal insulation blanket for draping around a surface to be insulated according to one embodiment of the present invention includes a plurality of blocks of flexible insulation material, a plurality of blocks of rigid insulation material, the blocks of flexible and rigid insulation material being joined together and alternately arranged into a plurality of insulation strips, and a plurality of intermediate strips of flexible insulation material joined to and alternately arranged with the plurality of insulation strips to create the thermal insulation blanket.

One object of the present invention is to provide an improved thermal insulation blanket.

Related objects and advantages of the present invention will be apparent from the following description.

DESCRIPTION OF THE PREFERRED EMBODIMENT

Figure 1:
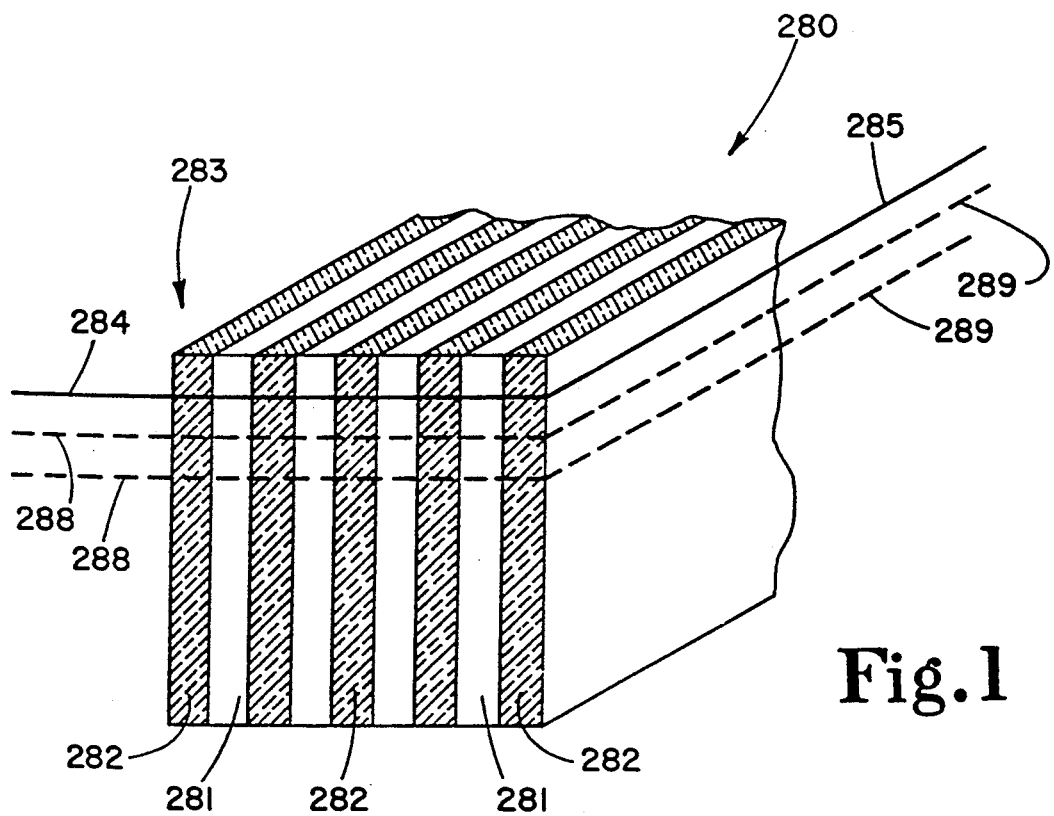
FIG. 1 is a partial perspective view of an insulation block from which insulation panels are cut according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In order to use rigid insulation, as opposed to or in combination with flexible insulation material, some suitable design needs to be employed in order to deal with complex and compound curved surfaces. Rigid material is desirable as a means to stiffen and provide rigidity to thin material shells and flexible skins. Rigid material may also provide a higher R-value than some flexible materials but molded rigid foam is expensive and a mixture of rigid and flexible insulation is a desirable compromise. Straight lengths of insulation material work well when a straight or uniform cavity is to be filled, such as a semi-cylindrical cavity. Since the flexible insulation material strips are compressible, this allows the rigid insulation strips to adapt to the outside diameter curvature. However, if there is a second curvature in a different plane so as to provide a compound curved surface, the task is not the same and the straight lengths of insulation material which extend the length of the cavity will not work. Compound curvatures require flexing or compressibility in at least two planes or directions. If a rigid strip can lay in one direction without interference, how can it at the same time bend 90 degrees or curve into another surface. The answer to the foregoing question is provided by the unique thermal insulation blankets illustrated in FIGS. 1-6.

Referring to FIG. 1, there is illustrated an insulation block 280 which includes an alternating series of flexible insulation material panels 281 and rigid insulation material panels 282. Adjacent panels of this alternating series of panels are bonded together by means of a suitable adhesive disposed between the panels. Once block 280 is formed, the next step in the assembly of a totally flexible blanket of rigid and flexible insulation material is to cut a top layer from block 280. Top layer 283 is separated from block 280 by a complete horizontal cut along the geometric plane containing cutting lines 284 and 285. Due to the adhesive bonding together of adjacent panels, the alternating strips of rigid and flexible insulation material of top layer 283 remain together, intact.

The next step in the process is to continue making horizontal cuts of uniform thickness as represented by broken lines 288 and 289 through the remainder of block 280 such that the then-next top layer of the reduced size block is separated. The result is a series of insulation panels (top layers 283) which are all similarly sized and shaped.

Figure 2:
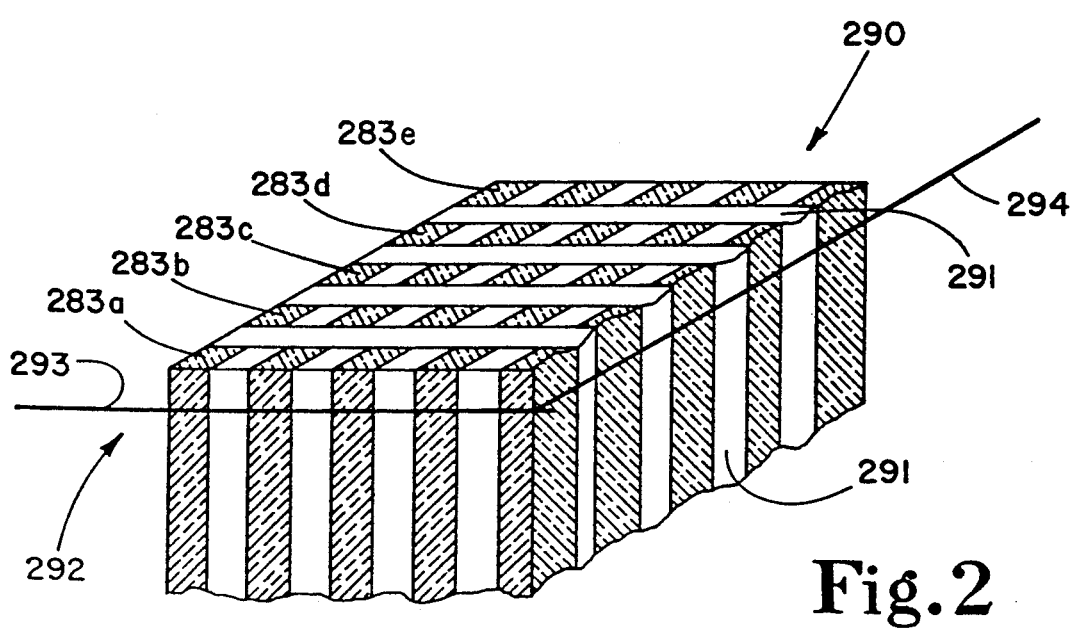
FIG. 2 is a partial perspective view of an insulation block incorporating insulation panels from the FIG. 1 block alternated with flexible insulation material.
Figure 3:
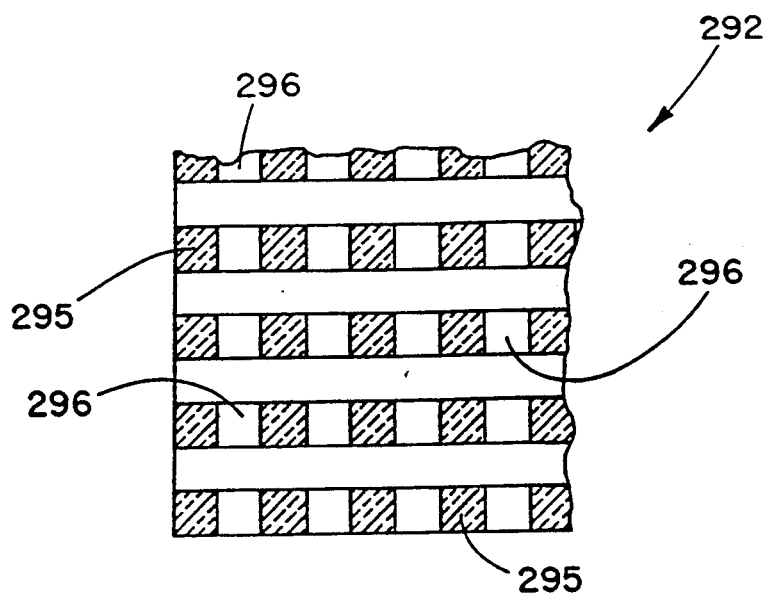
FIG. 3 is a partial top plan view of an insulation panel which is cut from the FIG. 2 insulation block.

The next step in the assembly process for one style of a totally flexible insulation blanket is to stack each of the removed top layers derived from the cutting of the block as illustrated in FIG. 1 into a new block 290 which includes representative top layers 283a–283d turned on end and alternated with panels 291 of flexible insulation material as illustrated in FIG. 2. The number and size of panels 281 and 282 may vary and the thickness of cut determines the number of panels or layers 283 which come from block 280. As with block 280 adjacent layers and panels are bonded together by means of a suitable adhesive. Once block 290 is fabricated, horizontal cuts are taken to remove top layer 292. Saw lines 293 and 294 represent the geometric plane of the first horizontal cut and the broken lines represent the remaining cuts which are taken so as to completely separate block 290 into a plurality of insulation blankets. In this particular arrangement, it is to be noted that the cutting planes do not have to be evenly or uniformly spaced since the top layer 292 which is removed goes directly into an end-use environment, such as being assembled to one half of an elbow shell or to one half of a T-shell or directly around a pipe, conduit, elbow or T-connector or directly around an object of a complex or compound curvature. The value of the insulation blanket provided by top layer 292 is its ability to bend or flex with virtually any curvature and in any direction. Compound curves can be easily covered by the blanket since the flexible insulation material of the blanket completely surrounds the four sides of each block or cube of rigid insulation material. Regardless of the direction of flex or bending or the degree or extent of flexing for each rigid block 295, there is flexible and compressible insulation material (block 296 or a strip) immediately adjacent which yields to allow the blanket to conform to virtually any desired shape. A top plan view of one top layer (blanket) 292 is illustrated in FIG. 3.

The use of rigid insulation material is desirable since it stiffens and adds rigidity to the shell skin and since the thermal insulation properties of many rigid insulation materials are superior to many flexible insulation materials. The heretofore problem with rigid insulation material is its inability to be used in any complex curved shape unless precisely molded resulting in a dramatically higher cost to the insulation device.

Figure 4:
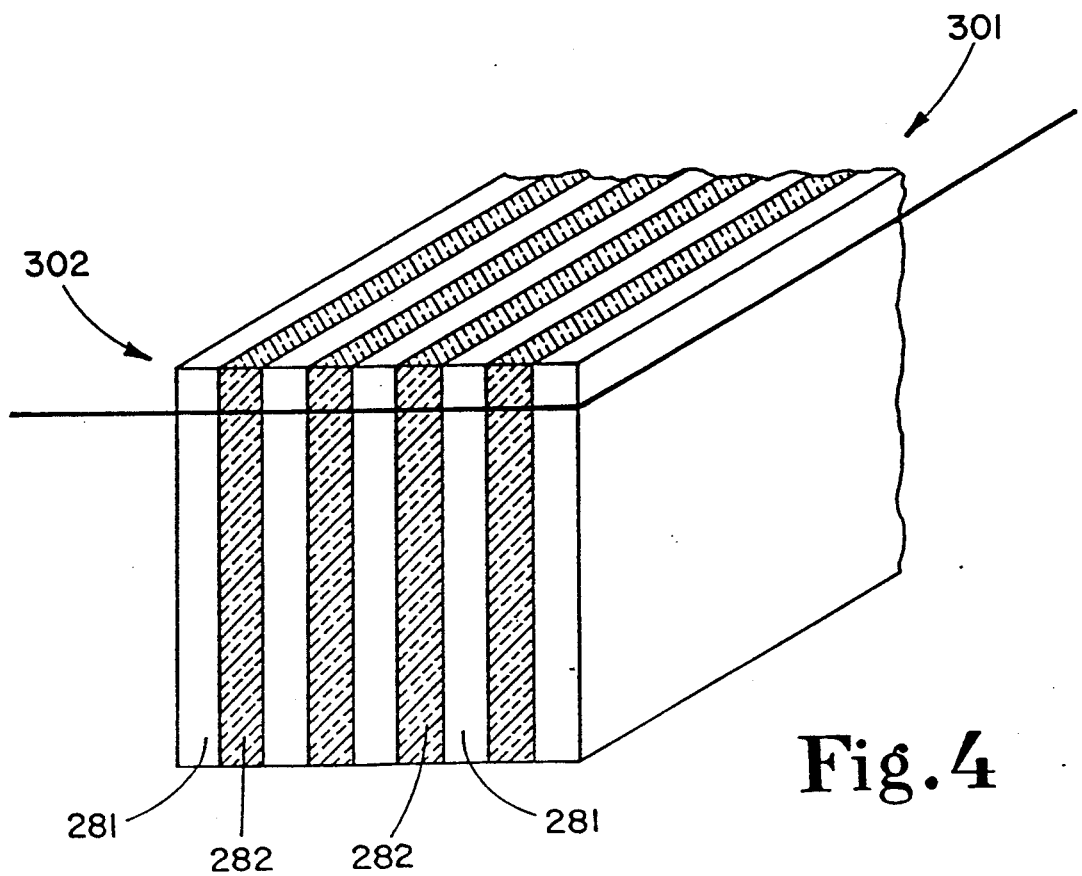
FIG. 4 is a partial perspective view of an insulation block incorporating alternating panels of flexible and rigid insulation material according to the present invention.
Figure 5:
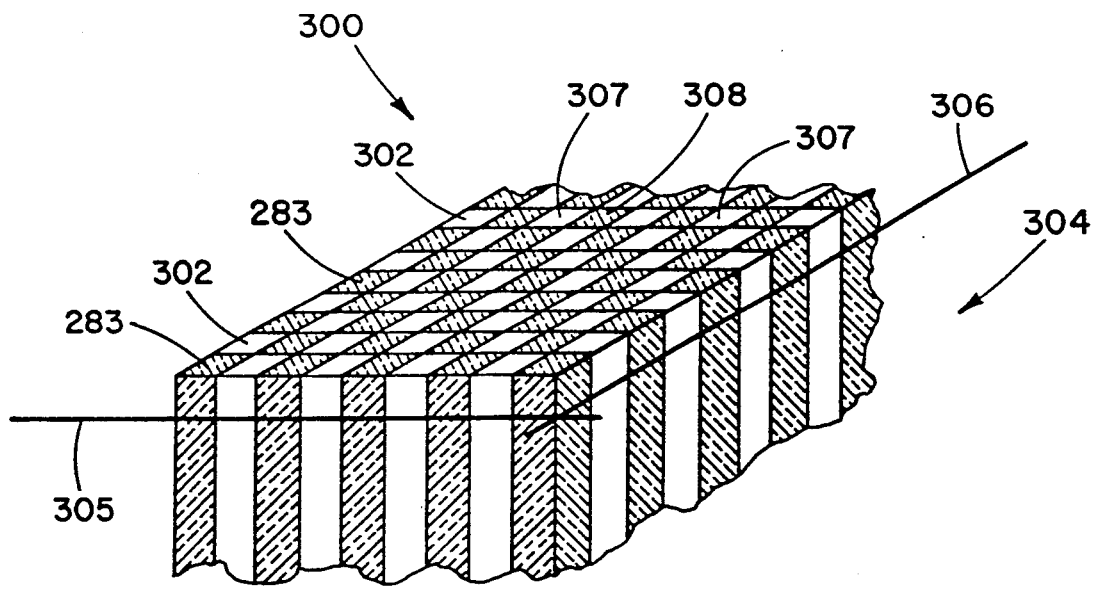
FIG. 5 is a partial perspective view of an insulation block made up of alternating panels of insulation cut from the FIG. 1 block and the FIG. 4 block.
Figure 6:
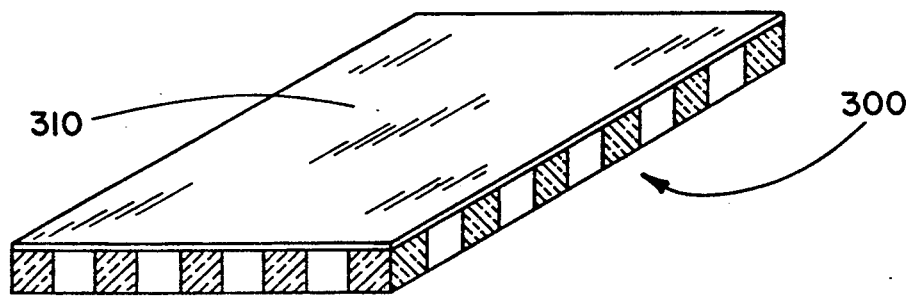
FIG. 6 is a perspective view of an outer layer bonded to a blanket of insulation material as cut from the FIG. 5 insulation block.

An alternative blanket style consistent with the foregoing fabrication steps and resulting panel design is illustrated in FIGS. 4 and 5. The difference between blanket 300 and top layer 292 lies in the third step of the assembly process. After all the top layers are cut from insulation block 280 and are turned on edge to be used to form block 290, a substitution occurs. For blanket 300 instead of using panels 291 of flexible insulation material between each pair of top layers, top layers are staggered and alternated with each other as to the position of flexible insulation material and rigid insulation material between adjacent panels providing a checkerboard type appearance. The most efficient way to fabricate this alternative blanket style is to begin with block 280 and to fabricate a similar block 301 (see FIG. 4) of equal size except that in block 301 the flexible insulation material panels 281 and the rigid insulation material panels 282 are in reverse sequence from the arrangement of block 280. In block 280, the rigid insulation panels are on the exterior surfaces while in block 301 it is the flexible insulation material panels which comprise the outer surfaces of the block. As top layers 283 and 302 are removed from their respective blocks 280 and 301, these layers are alternately laminated into block 304 (see FIG. 5) and bonded together with a suitable adhesive. By taking horizontal cuts in the plane defined by cutting lines 305 and 306, blanket 300 is separated from block 304. The manner in which the flexible insulation material blocks 307 are disposed on the four sides of each rigid insulation material block 308 makes blanket 300 able to bend or flex in virtually any direction and with virtually any curvature. Compound curves can be easily covered by blanket 300, and blanket 300, like top layer 292, is suitable to be used in combination with one-half of an elbow shell or with one half of a T-shell or blanket 300 may be applied directly to a pipe, conduit, elbow, or T-connector. To enhance the assembly of either insulating blanket 300 or 290 or to provide for improved handling capabilities an outer layer or facing material 310 (see FIG. 6) can be bonded to the blanket before, after, or during the horizontal cutting process. This material must be able to stretch and flex such as a thin polyethylene or PVC film or a thin flexible foam such as urethane.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A thermal insulation blanket for draping about a surface of compound curvature which is to be insulated, said thermal insulation blanket comprising:
   a plurality of flexible insulation material modules;
   a plurality of blocks of rigid insulation material, each block having a top surface, a bottom surface and side surfaces;
   said flexible insulation material modules being arranged relatively to said blocks of rigid insulation material such that a flexible insulation material module is adjacent to each of the side surfaces of each of said plurality of rigid insulation material blocks to create a checkerboard pattern; and
   said flexible insulation material modules and said rigid insulation material blocks being joined together in order to create said thermal insulation blanket.

* * * * *